United States Patent [19]
DeKoning et al.

[11] Patent Number: 5,974,502
[45] Date of Patent: Oct. 26, 1999

[54] APPARATUS AND METHOD FOR ANALYZING AND MODIFYING DATA TRANSFER REGUESTS IN A RAID SYSTEM

[75] Inventors: Rodney A. DeKoning; Donald R. Humlicek; Curtis W. Rink, all of Wichita, Kans.

[73] Assignee: LSI Logic Corporation, Milpitas, Calif.

[21] Appl. No.: 08/549,384

[22] Filed: Oct. 27, 1995

[51] Int. Cl.⁶ .................................................. G11B 17/22
[52] U.S. Cl. ........................... 711/114; 711/111; 710/36; 714/770
[58] Field of Search ................................ 395/441, 182.05, 395/182.04, 183.18; 371/40.1, 40.4, 51.1; 711/114, 165, 111; 710/36, 39, 60

[56] References Cited

U.S. PATENT DOCUMENTS

| | | | |
|---|---|---|---|
| 5,163,131 | 11/1992 | Row et al. | 395/200.32 |
| 5,235,690 | 8/1993 | Beardsley et al. | 395/440 |
| 5,421,031 | 5/1995 | De Bey | 455/5.1 |
| 5,455,934 | 10/1995 | Holland et al. | 711/4 |
| 5,519,435 | 5/1996 | Anderson | 348/8 |
| 5,519,849 | 5/1996 | Malan et al. | 395/500 |
| 5,555,390 | 9/1996 | Judd et al. | 395/439 |
| 5,561,793 | 10/1996 | Bennett et al. | 707/201 |
| 5,572,699 | 11/1996 | Kamo et al. | 395/441 |
| 5,574,851 | 11/1996 | Rathunde | 395/182.05 |
| 5,584,008 | 12/1996 | Shimada et al. | 395/441 |
| 5,598,549 | 1/1997 | Rathunde | 711/11 |
| 5,657,468 | 8/1997 | Stallmo et al. | 711/114 |
| 5,721,823 | 2/1998 | Chen et al. | 395/200.33 |
| 5,724,552 | 3/1998 | Taoda | 711/165 |

OTHER PUBLICATIONS

Andrew S. Tanenbaum, "Modern Operating System", 1992, Prentice Hall, Inc., pp. 27–71.

*Primary Examiner*—Eddie P. Chan
*Assistant Examiner*—Hong Kim

[57] ABSTRACT

The invention provides a method and apparatus for increasing the efficiency of data transfer between a host computer and a disk array in a RAID system. The invention operates by splitting up large I/O requests from the computer into smaller, more manageable pieces and processing the pieces as though they were individual I/O requests. In one embodiment, the invention keeps only a limited number of these smaller individual I/O requests "active" at any particular time so that a single large I/O request cannot preclude other I/O requests from making progress in the controller. Both the size of the smaller I/O request pieces and the limited number of these pieces which will be "active" at any one time may be tunable parameters. The invention improves the efficiency of data transfer between the host computer and the array of disk drives by providing for increased overlap of activity in the controller. This increased overlap of activity results in increased controller throughput.

22 Claims, 4 Drawing Sheets

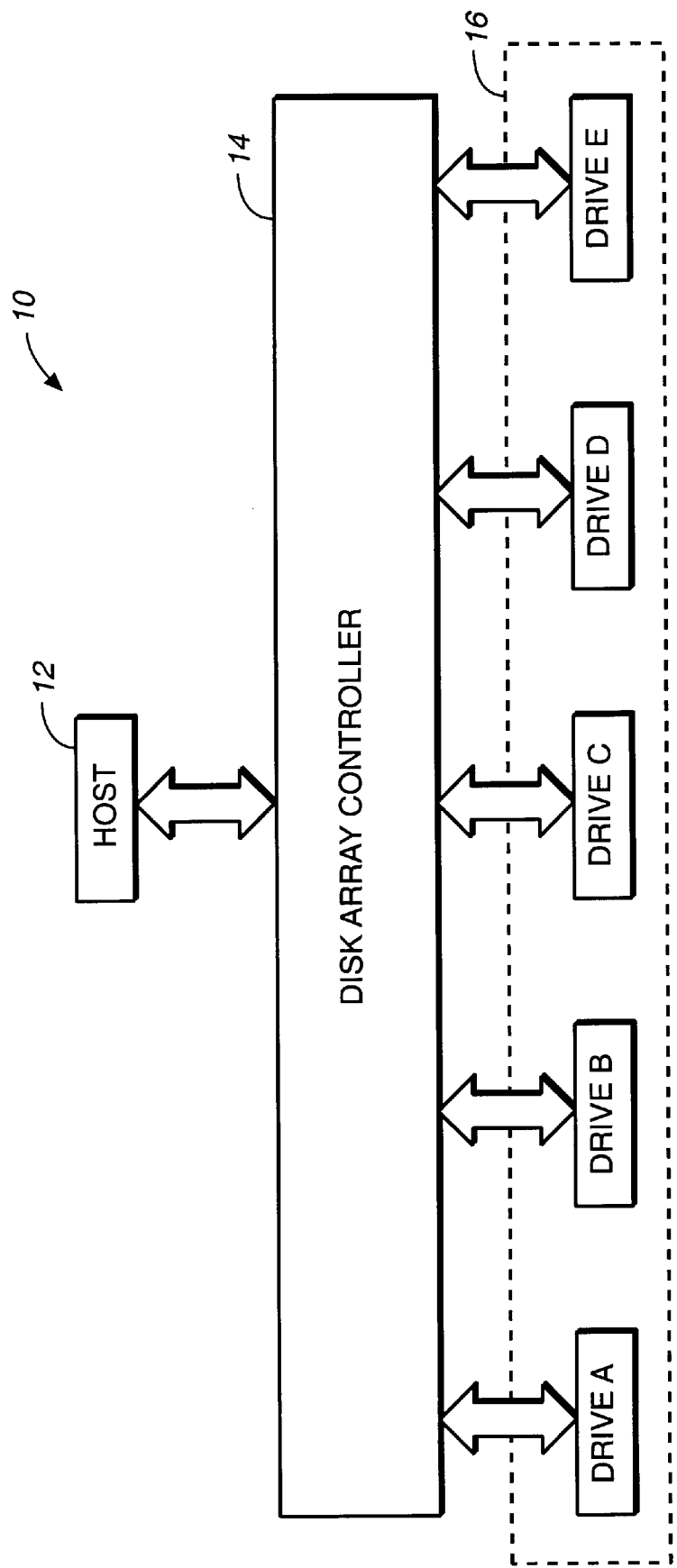
FIG._1 (PRIOR ART)

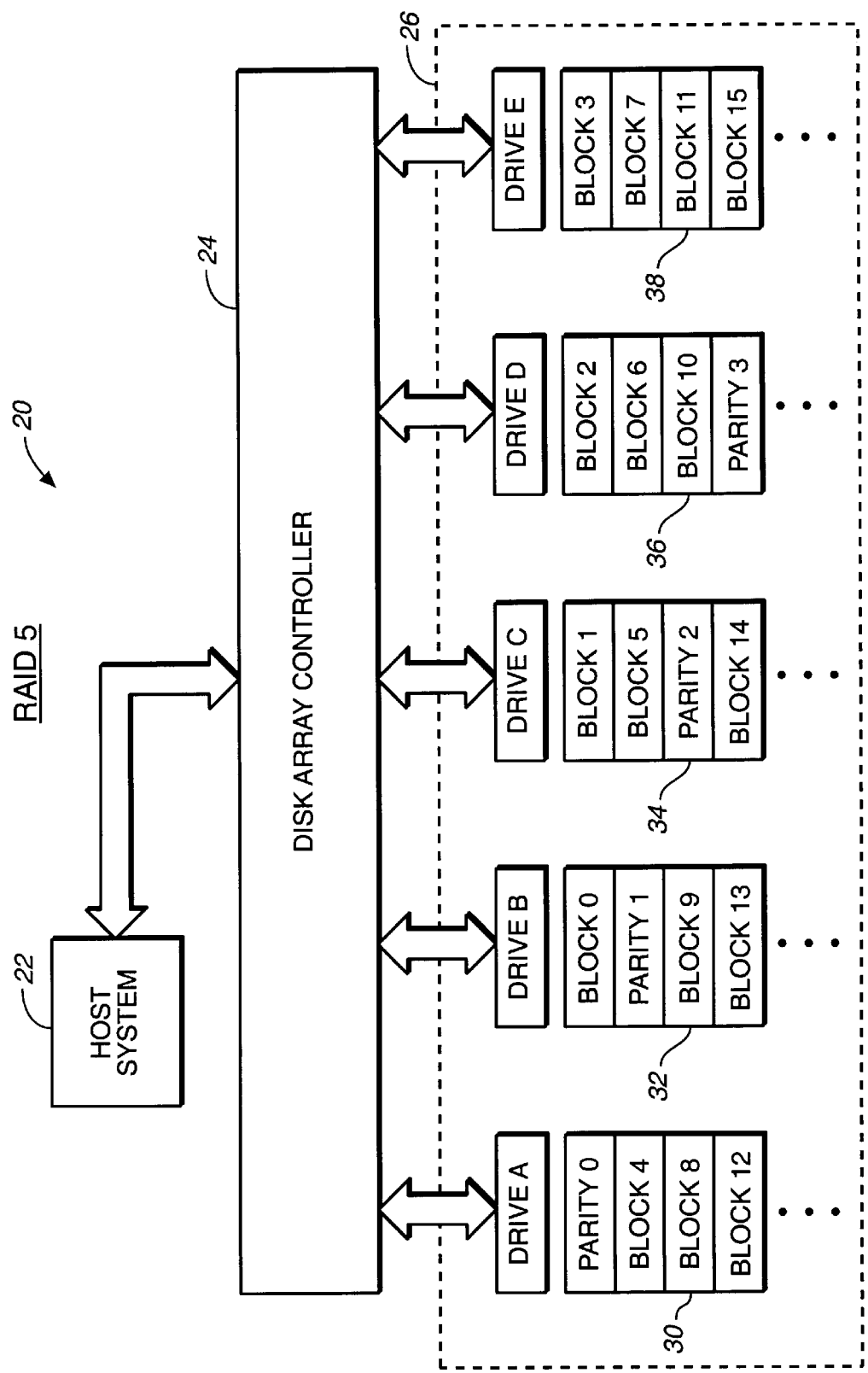
FIG._2

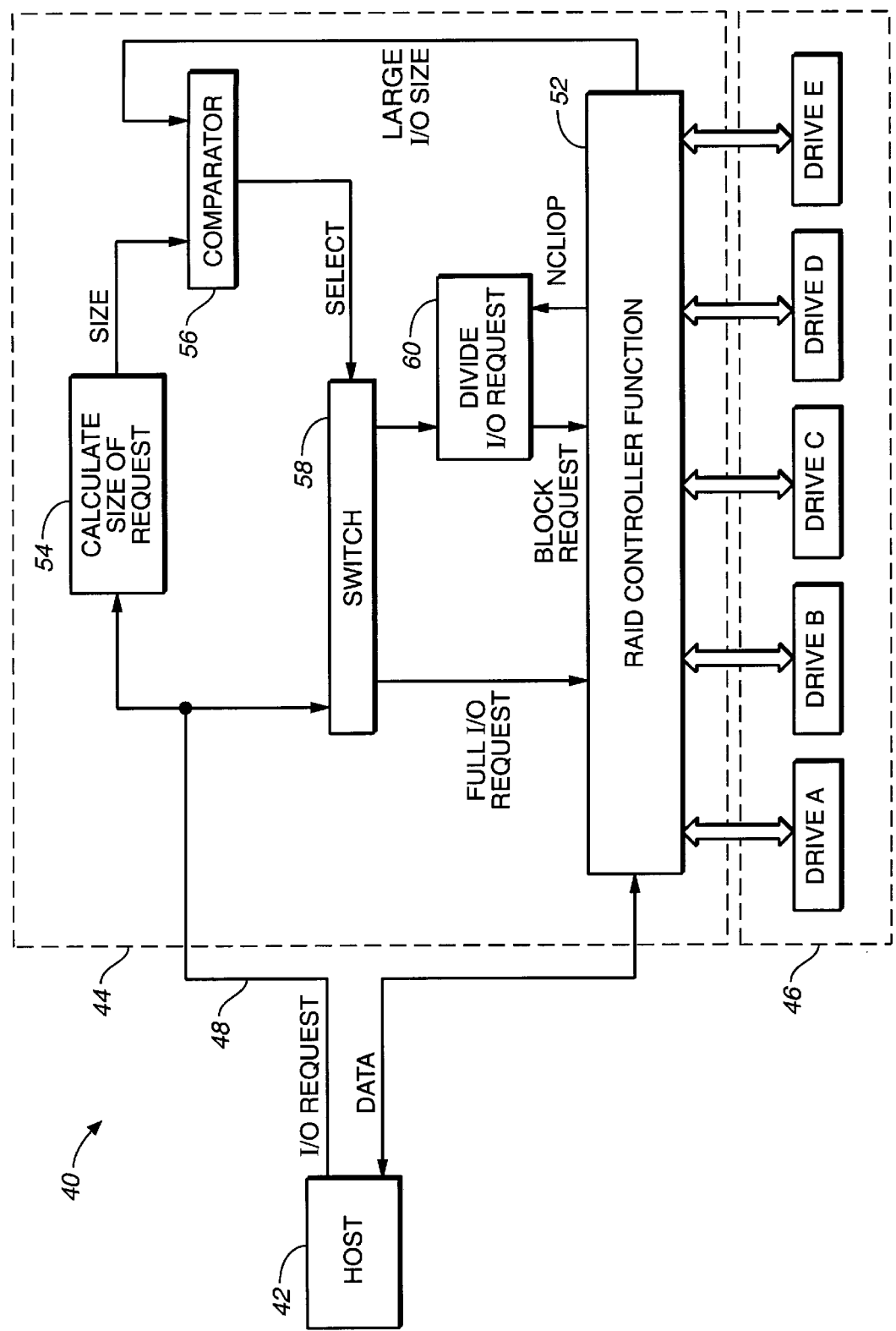
FIG._3

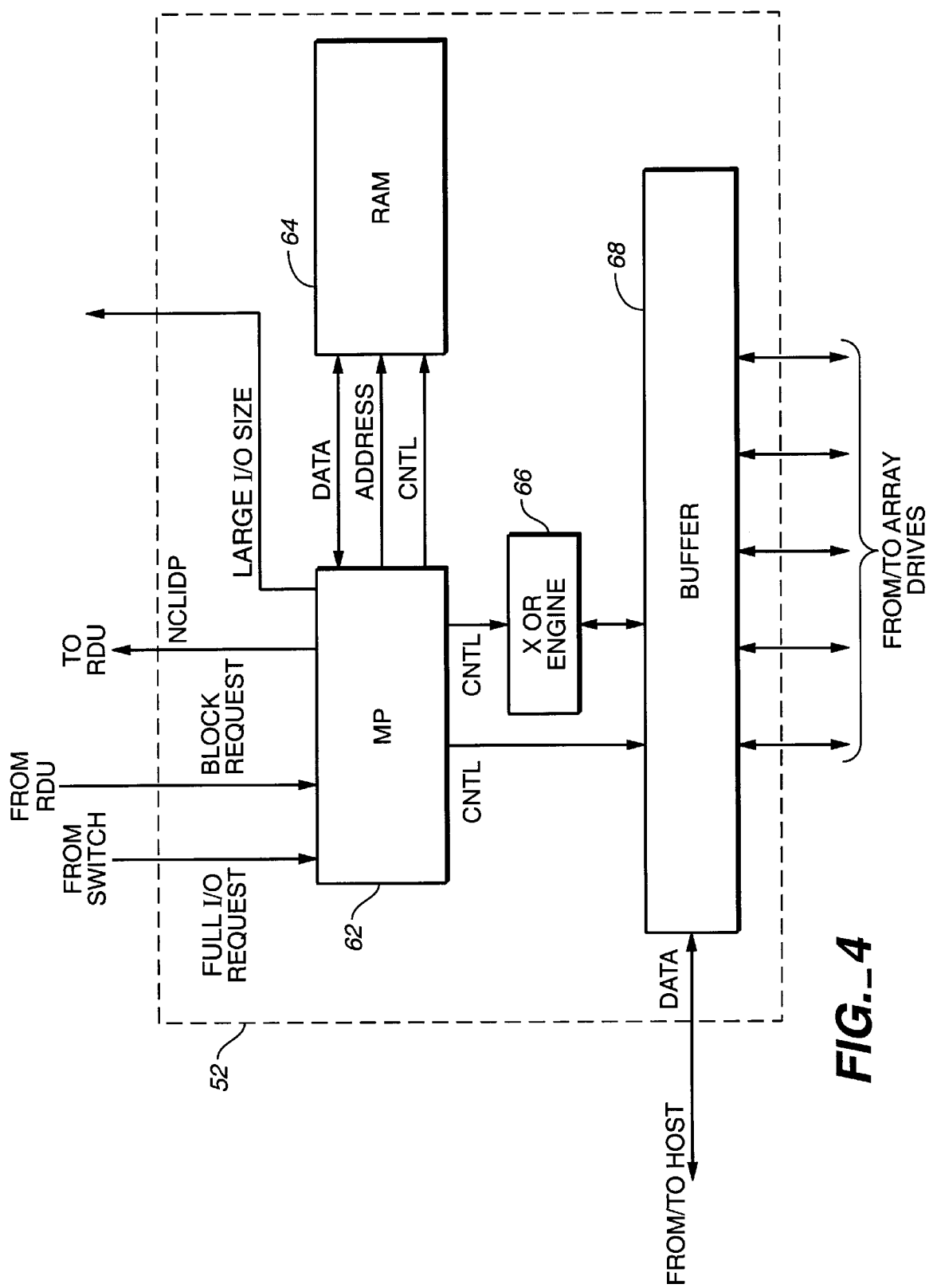
FIG._4

APPARATUS AND METHOD FOR ANALYZING AND MODIFYING DATA TRANSFER REGUESTS IN A RAID SYSTEM

FIELD OF THE INVENTION

The invention relates, in general, to magnetic data storage systems and, in particular, to an apparatus and technique for the efficient transfer of data between a host computer and an array of disk drives.

BACKGROUND OF THE INVENTION

Magnetic disk storage is currently the most widely used method of mass storage for computer systems. Traditionally, systems using this method of mass storage have included a single disk capable of storing large amounts of data. However, systems using an array of smaller capacity, less expensive disk drives are currently emerging as a low cost alternative to large single disk systems. These array systems are known as RAID (redundant array of inexpensive disks systems.

When used in conjunction with a host computer, a RAID system appears to behave just like a single disk system. RAID systems, however, offer many advantages over single disk systems. Among the advantages of RAID technology are improved reliability and performance. Reliability is improved through the use of redundancy information in the array which allows the system to continue operating even though one of the drives in the array has failed. The failed drive may then be replaced, and the lost data regenerated, without having to shut down the system. Conversely, if the one disk in a single disk system fails, the system is rendered inoperable and valuable data may be lost. RAID systems may achieve improvement in performance over single disk systems by, among other things, allowing data to be read from and written to multiple disks in the array in parallel. This greatly increases the speed with which I/O operations can be performed.

RAID technology encompasses a series of techniques for managing the operation of multiple disks. These techniques are discussed in an article entitled "A Case for Redundant Arrays of Inexpensive Disks (RAID)" by Patterson, Gibson, and Katz of the University of California (Report No. UCB/CSD 87/391, December 1987) which categorizes the different techniques into five RAID "levels" and is hereby incorporated by reference. Each RAID level represents a different approach to storing and retrieving data and the associated redundancy information across the array of disk drives.

FIG. 1 illustrates a typical RAID system 10. This system 10 may be used to implement any of the five RAID levels. As seen in the figure, the system 10 includes: a host computer 12, a disk array controller 14, and an array of disk drives 16. The host computer 12, in addition to other tasks, is operative for sending I/O commands to the disk array controller 14, instructing the controller 14 to perform certain read and/or write operations. The disk array controller 14 receives the commands from the host computer 12 and coordinates the transfer of data between the host computer 12 and the array of disk drives 16 in accordance with specific stored algorithms. The array of disk drives 16 includes a plurality of drives which are each independently coupled to and controlled by the disk array controller 14 for receiving, storing, and retrieving data delivered to it by the controller 14.

As described above, the disk array controller 14 includes stored algorithms which the controller 14 uses to coordinate the transfer of data between the host computer 12 and the array 16. The algorithms perform such tasks as determining and reserving an adequate amount of buffer space to perform a particular transfer, controlling the delivery of data between the buffer and the host computer 12, calculating the redundancy data to be stored in the disk array 16, distributing write data and redundancy data to the separate drives in the array 16, and retrieving data from the disk array 16. It should be apparent that the algorithm used to perform any particular transfer will depend on both the I/O function being requested and the RAID level being implemented.

In performing its function of coordinating the transfer of data between the host computer 12 and the array of disk drives 16, it is desirable that the disk array controller 14 operate as efficiently as possible. Improved efficiency of operation in the controller 14 will result in improved data transfer bandwidths between the host computer 12 and the array 16.

SUMMARY OF THE INVENTION

The invention provides a method and apparatus for increasing the efficiency of data transfer between a host computer and a disk array in a RAID system. The invention operates by splitting up large I/O requests from the computer into smaller, more manageable pieces and processing the pieces as though they were individual I/O requests. In one embodiment, the invention keeps only a limited number of these smaller individual I/O requests "active" at any particular time so that a single large I/O request cannot preclude other I/O requests from making progress in the controller. Both the size of the smaller I/O request pieces and the limited number of these pieces which will be "active" at any one time may be tunable parameters. The invention improves the efficiency of data transfer between the host computer and the array of disk drives by allowing for increased overlap of activity in the controller. In other words, controller operations such as: (1) data transfers between the host and the buffer, (2) buffer setup in the controller, and (3) data transfers between the buffer and the drives can take place, to an increased extent, at the same time. This increased overlap of activity results in increased controller throughput.

In one aspect of the present invention, a data storage system is provided comprising: (a) an array of disk drives; (b) a host computer capable of issuing I/O requests for read and write operations to be performed using the array of disk drives, the read and write operations requiring a transfer of data between the host computer and the array of disk drives; (c) means for coordinating the transfer of data between the host computer and the array of disk drives in response to the I/O requests from the host computer; and (d) means for determining an amount of data required to be transferred between the host computer and the array of disk drives for each I/O request issued by the host computer, comparing the amount of data to a predetermined amount, dividing each I/O request into a plurality of separate block requests whenever the amount of data exceeds the predetermined amount, each block request requiring a transfer of no more than the predetermined amount of data, and issuing each of the plurality of separate block requests to the means for coordinating as an individual I/O request. By dividing larger I/O requests, the system allows greater functional overlap in the means for coordinating which can result in increased controller throughput.

In one embodiment of the system of the present invention, the means for coordinating processes no more than a predetermined number of separate block requests at one time.

This also allows greater functional overlap in the controller. In addition, both the predetermined amount of data and the predetermined number of separate block requests may be adjustable parameters to provide even further gains in functional overlap. For example, the system of the present invention may include a feedback loop for dynamically tuning either or both of the parameters based on measured system variables to ensure continuous, efficient data transfer between the host computer and the array of disk drives.

In another aspect of the present invention, a method for increasing data transfer efficiency between a host computer and an array of disk drives is provided. The method comprises the steps of: (a) receiving an I/O request from the host computer; (b) determining an amount of data required to be transferred between the host computer and the array of disk drives to process the I/O request; (c) dividing the I/O request into a plurality of block requests when the amount of data exceeds a predetermined amount of data, each of the plurality of block requests requiring a transfer of no more than the predetermined amount of data; and (d) processing each of the block requests as an individual I/O request. As described above, dividing larger I/O requests allows greater functional overlap in the means for coordinating which can result in increased controller throughput.

In one embodiment, the method further includes the step of processing no more than a predetermined number of block requests concurrently in an array controller. In addition, both the predetermined amount of data and the predetermined number of block requests may be adjustable parameters. In this regard, the method may also include the step of adjusting either or both of these parameters to increase data transfer bandwidth between the host computer and the array of disk drives. Similarly, the method may include the step of dynamically adjusting either or both of the parameters based on a plurality of measured system variables, via a feedback loop.

BRIEF DESCRIPTION OF THE DRAWINGS

FIG. 1 is a block diagram illustrating a typical RAID data storage system;

FIG. 2 is a block diagram illustrating a RAID system implementing RAID level 5;

FIG. 3 is a block diagram illustrating a RAID system implementing one embodiment of the present invention; and FIG. 4 is a block diagram illustrating one embodiment of the RAID controller function unit 52 of FIG. 3.

DETAILED DESCRIPTION

The present invention provides a RAID data storage system which is capable of more efficient operation than past RAID systems. The invention accomplishes this, in part, by splitting up large I/O requests from the computer into smaller, more manageable pieces and processing these pieces as though they were individual I/O requests. In one embodiment, the invention keeps only a limited number of these smaller individual I/O requests "active" at any particular time so that a single large I/O request cannot preclude other I/O requests from making progress in the controller. Both the size of the smaller I/O request pieces and the limited number of these pieces which will be "active" at any one time may be tunable parameters.

To better understand the utility and functioning of the present invention, a description will now be made of the various RAID levels. As described above, RAID technology was originally divided into five separate levels, each level representing a particular technique for storing and retrieving data and redundancy information to and from an array of disk drives. Since that time, other RAID levels have been defined, most of which are merely combinations of the original five levels. Consequently, only the original five levels will be described. It should be appreciated, however, that the present invention can be used with RAID systems implementing any of the various RAID techniques, such as RAID level 0, and also in other bridge controller architectures which control multiple devices, such as JBOD systems.

RAID level 1 includes the RAID techniques known as mirroring and duplexing. Mirroring comprises making a duplicate copy of the write data and storing the original write data and the duplicate data on separate disks. In this way, if the disk storing the original data fails, the data is still available on the alternate drive. Duplexing is similar to mirroring but goes one step further by also providing a duplicate disk controller and cable to further increase redundancy in the system. These techniques offer a high degree of reliability, but are relatively expensive to implement because they require double the storage space that would normally be required to store the data. Nonetheless, the level 1 techniques are currently the most widely used in RAID systems.

In RAID level 2, the write data is bit interleaved across the drives in the array (i.e., the first bit is stored on the first drive, the second bit is stored on the second drive, etc.) with some of the drives being reserved for error correctional codes (ECCs) corresponding to the stored write data. If one or more of the drives fail, the error correctional codes may be used to reconstruct the lost data. This technique offers high performance and reliability but, like the level 1 techniques, is very expensive to implement. The technique is expensive because the number of drives required to implement the technique corresponds to the word length used by the system (i.e., 32 drives in a 32 bit system) plus the additional drives required for storing the ECC. This level is normally used in applications requiring high data transfer rates.

RAID level 3 uses byte interleaving across the drives in the array with one of the drives being reserved for parity information. If a data drive in the array fails, the parity information and the data on the surviving data drives can be used to reconstruct the lost data. If the parity drive fails, the data can be read from and written to the data drives as usual. Byte interleaving allows the level 3 system to employ all of the drives in the array in parallel for every read or write operation and, therefore, level 3 systems are generally referred to as parallel access arrays. Because the disk drives are accessed in parallel, level 3 systems support extremely high data transfer rates. As such, level 3 systems are best suited for applications having low to medium I/O volume with relatively long records.

RAID level 4 employs block interleaving across the drives in the array with one of the drives being reserved for parity information. Block interleaving allows the reading or writing of a complete logical data unit in a single I/O data access. Systems using this technique are capable of reading multiple drives simultaneously (depending on block length), but cannot write to more than one drive at a time because all writes must share the same parity drive. Consequently, level 4 systems are best suited for processing short records which are read more often than written. Because the disk drives in a level 4 system can be accessed individually, these systems are known as independent access arrays.

RAID level 5 provides block interleaving and independent access like level 4, but instead of reserving a single drive for parity information, level 5 systems distribute the parity information across all of the drives in the array. FIG. 2 illustrates one way of accomplishing such a distribution of the parity information. This distribution of the parity information allows the system to perform multiple write operations concurrently, resulting in high transaction throughput. Level 5 systems are best suited to handle high I/O activity with relatively short records.

Operation of a RAID system, implementing any of the above-described levels, with one or more failed drives is known as degraded mode operation. Once in degraded mode, the tolerance of the system to additional hardware faults is reduced or eliminated. To take a system out of the degraded mode of operation, it is usually necessary to replace, or "hot-swap", the failed drive with a fully operational drive. After hot-swapping the failed drive, the missing data may then be reconstructed by the RAID controller using the redundancy information and stored on the new drive, thus restoring the system to full fault tolerance.

The invention will be described as implemented in a RAID level 5 data storage system 20, such as the one illustrated in FIG. 2. As seen in the figure, a RAID level 5 system may include: a host system 22, a disk array controller 24, and an array of disk drives 26. As described previously; the disk array controller 24 receives I/O requests from the host 22 and performs these I/O requests by coordinating the transfer of data between the host 22 and the array of disk drives 26. The array of disk drives 26 may include any number of drives, each of which is capable of being read from and written to by the controller 24.

As mentioned previously, in a RAID level 5 system, data is block interleaved among all of the drives 30–38 in the array 26 with interspersed parity information. FIG. 2 illustrates one method of accomplishing this. In FIG. 2, each parity block stored in the array corresponds to 4 data blocks to form a redundancy group, i.e., PARITY 0 corresponds to BLOCKs 0, 1, 2, and 3 to form a first redundancy group, PARITY 1 corresponds to BLOCKs 4, 5, 6, and 7 to form a second redundancy group, etc. As seen in the figure, parity information is stored on every disk in the array 26 in a staggered fashion across the array.

The parity information stored in the parity block of any particular redundancy group may be calculated in the controller 24 using a bit wise exclusive-OR of the data stored in the 4 corresponding data blocks. In this regard, anytime it is desired to rewrite the data in one of the data blocks of a redundancy group, the corresponding parity information has to be recalculated and resaved. Recalculation of the parity information can be accomplished in one of two ways. In one approach, the controller can read the data blocks from the four data drives which are not being written to and exclusive-OR these with the new write data to create the new parity information. In a simpler and preferred approach, called the Read-Modify-Write method, the controller first reads the data block to which new data is to be written and the corresponding parity block and then bit-wise exclusive-ORs the two blocks with the new data to create the new parity information. The new data and new parity information are then written to the appropriate blocks.

If one of the disk drives 30–38 in the array 26 fails, operation of the RAID level 5 data storage system 20 may continue in degraded mode. In other words, if drive D in FIG. 2 fails, data can still be read from and written to the array 26, even if the data is supposed to be stored on drive D. For example, suppose Drive D fails and it is desired to write data to BLOCK 2. Instead of writing the data to BLOCK 2, the level 5 controller simply reads BLOCKs 0, 1, and 3 and exclusive-ORs them with the new data to create new parity information for PARITY 0. When it is desired to read from BLOCK 2, the controller simply reads BLOCKs 0, 1, and 3 and PARITY 0 and uses the data obtained to calculate the desired data.

FIG. 5 illustrates a computer system 40 implementing one embodiment of the present invention. The computer system 40 includes: a host computer 42, a disk array controller 44, and an array of disk drives 46. The host computer 42 delivers I/O requests to the disk array controller 44 via I/O request line 48. The disk array controller 44 then processes the I/O requests by controlling the transfer of data between the host computer 42 and the array of disk drives 46. When a write operation is being performed, the host 42 delivers data to the controller, via data line 50, where it is separated, processed, and distributed to the array of disk drives 46 according to the appropriate RAID level. When a read operation is being performed, the controller 44 accesses and assembles the requested data from the array of disk drives 46 according to the appropriate RAID level and delivers the data to the host computer via data line 50.

As illustrated in FIG. 3, the disk array controller 44 may include: a request size calculation unit (RSCU) 54, a comparator 56, a switch 58, a request division unit (RDU) 60, and a RAID controller function unit (RCFU) 52. The controller 44 may be implemented in the form of a plug-in card for a computer or as a resident circuit in a drive array subsystem. The RSCU 54 is operative for receiving I/O requests from the host computer 42 via I/O request line 48 and for calculating the amount of data which each I/O request requires to be transferred between the host 42 and the array 46. The comparator 56 receives a signal from the RSCU 54 indicative of the size of a current request and compares the size of the current request to a LARGE I/O SIZE parameter received from the RCFU 52. The LARGE I/O SIZE parameter represents the largest single I/O request which will be processed by the RCFU 52 of the present invention and, as will be described in more detail shortly, may be a tunable parameter.

The comparator 56 creates an output signal indicative of whether the size of the current I/O request is greater than the LARGE I/O SIZE parameter. This output signal is then used by switch 58 to determine whether to deliver the current I/O request directly to the RCFU 52 or to deliver it first to the RDU 60. If the size of the current I/O request is less than or equal to the LARGE I/O SIZE parameter, than the entire request is delivered to the RCFU 52 for processing. If the size of the current I/O request is greater than the LARGE I/O SIZE parameter, the request is delivered to the RDU 60 which, among other things, divides the current I/O request into a plurality of block requests which are each equal to or smaller in size than the LARGE I/O SIZE parameter. The RDU then delivers the block requests to the RCFU 52.

As illustrated in FIG. 3, the RDU 60 may receive a NUMBER OF CONCURRENT LARGE I/O PIECES (NCLIOP) parameter from the RCFU 52. The NCLIOP parameter represents the total number of block requests that will be active in the RCFU 52 at any one time. The RDU 60 receives the NCLIOP parameter and uses it to determine how many block requests to issue concurrently to the RCFU 52. As with the LARGE I/O SIZE parameter, the NCLIOP parameter of the present invention may be a tunable parameter.

FIG. 4 illustrates one embodiment of the RFCU 52 of FIG. 3. As seen in the figure, the RFCU 52 may include: a microprocessor 62, a random access memory (RAM) 64, an exclusive-OR (XOR) engine 66, and a buffer memory 68. The microprocessor 62 is operative for controlling the timing and operation of the RCFU 52. The microprocessor 62 receives the current I/O request either as a full I/O request from the switch 58 or as a series of block requests from the RDU 60 and proceeds to process the requests. To process the requests, the microprocessor 62 must perform such functions as: (a) allotting microprocessor overhead, (b) reserving space in the buffer memory 68 to receive and store data from the host 42 or from the array 46, (c) controlling the transfer of data between the buffer 68 and the host 42, (d) requesting the XOR engine 66 to perform operations using data stored in the buffer 68 in order to produce redundancy information or to regenerate data stored on a failed drive, (e) controlling the transfer of data and redundancy information from the array 46 to the buffer 68, and (f) controlling the transfer of data and redundancy information from the buffer 68 to the proper locations in the array 68. All of these operations will be performed in accordance with the RAID level which is being implemented in the controller. The RAM 64 is operative for, among other things, storing the algorithms used by the microprocessor 62 in performing the I/O requests.

As described previously, the NCLIOP parameter represents the total number of block requests that will be active in the RCFU 52 at any one time. By "active" it is meant that the microprocessor will only reserve enough buffer resources to process a specific number of the block requests, X, at any one time. Initially, the microprocessor will load data into the buffer 68 corresponding to the first X block requests and will begin to process the data. When the processing of the data corresponding to one of the X block requests is completed, the microprocessor 62 will load data into the buffer 68 corresponding to the next block request and will begin to process that data. The result of this is that the total number of block requests which are active, or are becoming active, in the RCFU 52 is constant until the full I/O request is near completion.

The disk array controller 44 of FIG. 3 may be used in conjunction with any number of different host computers or drive arrays. These host computers and drive arrays may operate at any number of different channel speeds. The present invention is capable of tuning the LARGE I/O SIZE parameter and the NCLIOP parameter to increase the efficiency of data transfer between the host 42 and the array 46. In general, the optimal values for the LARGE I/O SIZE and NCLIOP parameters will be the values which allow the greatest amount of functional overlap to occur in the RCFU 52. In other words, the optimal values of the two parameters will result in the RCFU 52 being able to perform a maximum number of different functions concurrently and, therefore, to maximize data throughput in the controller 24.

In one embodiment of the present invention, a static tuning approach is implemented. In this approach, the RAM 64, or another memory device, stores substantially optimal values for the LARGE I/O SIZE and NCLIOP parameters for each possible combination of system variables, such as host channel speed and drive channel speed. These substantially optimal values may be determined empirically or by utilizing an appropriate algorithm. The microprocessor 62 determines the type of host 42 and drive array 46 which are being used by dynamically inquiring the active channels and by knowing the respective clock frequencies. Once the microprocessor 62 determines the type of host 42 and drive array 46 that is being used, it retrieves the appropriate parameter data from the RAM 64. The microprocessor 62 then transmits the LARGE I/O SIZE parameter to the comparator 56 and the NCLIOP parameter to the RDU 60.

In addition to host channel speed and drive channel speed, other system variables may also be used in the above-described embodiment. For example, optimal values for the LARGE I/O SIZE and NCLIOP parameters can be found and stored for every possible combination of host channel speed, drive channel speed, XOR engine processing speed, and processor overhead. Values for all of these variables would then have to be estimated by the controller and the appropriate parameters retrieved from the memory. A problem with this embodiment is that once a particular set of optimal values is being used, the system is unable to change the parameters if one or more of the system variables changes.

Therefore, in another embodiment of the present invention, a dynamic feedback tuning approach is implemented. In this approach, the microprocessor 62 periodically estimates the values of a number of different feedback variables and uses these values to dynamically tune the LARGE I/O SIZE and NCLIOP parameters. The feedback approach offers the advantage that it is free running and therefore is constantly adapting the drive array controller 44 to the needs of the system 40.

Among the feedback variables which may be used by the invention are: measured or estimated incoming I/O rate, I/O rate from the disk array, XOR processing rate, cache full percentage, controller overhead, and others. The microprocessor 62 can, for example, approximate the values of these variables by utilizing known feedback techniques. Once the values of these parameters are known or approximated, the microprocessor 62 can tune the values of the LARGE I/O SIZE and NCLIOP parameters according to a formula or by other methods. The formula can be developed by empirical means or based upon known I/O relationships.

As mentioned previously, the dynamic feedback tuning approach periodically determines values for a number of feedback variables and uses the variables to update the LARGE I/O SIZE and NCLIOP parameters. During the period between updates, the RCFU 52 processes the current block requests using the current values of the parameters. It should be appreciated that in one embodiment of the present invention, the length of the period between updates, known as the I/O interval, is another system parameter which may be tuned in the controller 44.

The operation of an embodiment of the present invention employing dynamic feedback tuning will now be described. As mentioned above, when dynamic feedback tuning is being used, the invention periodically updates the values of the two parameters based on estimated feedback variable values. The description will assume that at the time of the last update, the value of the LARGE I/O SIZE parameter became 256 Kbytes and the value of the NCLIOP parameter became 2. The description will also assume that the host computer 42 has just delivered an I/O request to the controller 44 requesting that 1 Mbyte of information be read from the array 46 and transferred to the host 42.

The RSCU 54 receives the I/O request from the host 42 and determines that it requires 1 Mbyte of data to be transferred. The RSCU 54 delivers this information to the comparator 56 which determines that the size of the request is greater than the LARGE I/O SIZE parameter, i.e., 256 Kbytes, and consequently causes the switch 58 to direct the I/O request to the RDU 60. The RDU 60 divides the I/O request into four block requests of 256 Kbytes each. The RDU 60, responsive to the NCLIOP parameter, then delivers two of the block requests to the RCFU 52 for processing.

By this point, the microprocessor 62, knowing the value of the NCLIOP parameter, has already set up buffer space in the buffer memory 68 capable of processing two block requests from the RDU 52 concurrently. The microprocessor 62 receives the two block requests from the RDU 60 and begins to process them. The microprocessor 62 causes data from the array 46 to be loaded into the reserved buffer space in the buffer memory 68 in accordance with the two block requests and, subsequently, causes this data to be transferred to the host computer 42. As each block request is completed, the microprocessor inputs another block request from the RDU 60 and begins to process it. This process continues until all of the block requests have been completed. If XOR functions have to be performed to read the data from the array (e.g., during degraded mode operations), the XOR engine 66 may be utilized. Because the I/O request has been divided into manageable pieces, data transfers from the array, data transfers to the host, and XOR operations may take place, to an increased extent, simultaneously.

Eventually, another update of the LARGE I/O SIZE parameter and the NCLIOP parameter will be made by the microprocessor 62. The microprocessor 62 will estimate the values of the feedback variables using known feedback techniques. Once the values are known, the microprocessor 62 determines new LARGE I/O SIZE and NCLIOP parameters using the values as described above. The new parameter values are then used by the system to process the I/O requests from the host 42.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A data storage system comprising:
   an array of disk drives, each disk drive capable of receiving, storing, and retrieving data;
   a host computer configured to issue I/O requests, wherein each said I/O request defines a respective amount of data required to be transferred between said host computer and said array of disk drives;
   means for coordinating transfer of the defined amount of data required to be transferred between said host computer and said array of disk drives in response to said issued I/O requests from said host computer;
   means for determining the respective amount of data required to be transferred between said host computer and said array of disk drives for an I/O request issued by said host computer, for comparing said amount of data to be transferred for a particular issued I/O request to a predetermined amount, for dividing each said I/O request into a plurality of separate block requests whenever said amount of data exceeds said predetermined amount, each separate block request requiring a transfer of no more than said predetermined amount of data, and for issuing each of said plurality of separate block requests to said means for coordinating as an individual I/O request; and
   feedback means for adjusting the predetermined amount based on measured system variables.

2. The system, as claimed in claim 1, wherein:
said means for coordinating includes:
   (i) a buffer memory;
   (ii) first transferring means for transferring write data from said host computer to said buffer memory;
   (iii) second transferring means for transferring write data from said buffer memory to said array of disk drives, said second transferring means including:
      (A) means for determining redundancy data, using said write data, according to a predetermined RAID technique;
      (B) means for apportioning said write data according to said predetermined RAID technique; and
      (C) means for distributing said redundancy data and said apportioned write data to said array of disk drives according to said predetermined RAID technique;
   (iv) third transferring means for transferring read data from said array of disk drives to said buffer memory according to said predetermined RAID technique; and
   (v) fourth transferring means for transferring read data from said buffer memory to said host computer.

3. The system, as claimed in claim 1, wherein:
said means for coordinating processes no more than a predetermined number of said separate block requests at one time.

4. The system, as claimed in claim 3, wherein:
said predetermined number is adjustable.

5. The system, as claimed in claim 4, wherein:
said predetermined number is adjusted to increase data transfer bandwidth between said host computer and said array of disk drives.

6. The system, as claimed in claim 4, further including:
feedback means for adjusting said predetermined number based on measured system variables.

7. The system, as claimed in claim 6, wherein:
said feedback means is capable of dynamically adjusting said predetermined number during operation of said data storage system.

8. The system, as claimed in claim 3, wherein:
said means for coordinating further includes:
   control means for receiving and controlling the performance of said I/O requests;
   a buffer memory for temporarily storing data as said data is transferred between said host computer and said array of disk drives, said buffer memory being controlled by said control means; and
   mathematical means for calculating redundancy information based on data stored in said buffer memory, under the control of said control means.

9. The system, as claimed in claim 8, further including:
means for determining the measured system variables by measuring one or more of the following variables: host channel speed, drive channel speed, processing speed of said mathematical means, occupancy level of said buffer memory, and control means overhead.

10. The system, as claimed in claim 9, further including:
means for adjusting said predetermined number based on said one or more variable values.

11. The system, as claimed in claim 10, wherein:
said means for adjusting includes feedback means capable of dynamically adjusting said predetermined number.

12. The system, as claimed in claim 10, wherein:
said data storage system comprises a RAID data storage system.

13. The system, as claimed in claim 1, wherein:
said predetermined amount is adjusted to increase data transfer bandwidth between said host computer and said array of disk drives.

14. The system, as claimed in claim 1, wherein:
said feedback means is capable of dynamically adjusting said predetermined amount during operation of said data storage system.

15. In a computer data storage system, a method for increasing data transfer efficiency between a host computer and an array of disk drives, said method comprising the steps of:

receiving an I/O request from said host computer;

determining an amount of data required to be transferred between said host computer and said array of disk drives to process said I/O request;

dividing said I/O request into a plurality of block requests when said amount of data exceeds a predetermined amount of data, each of said plurality of block requests requiring a transfer of no more than said predetermined amount of data;

processing each of said block requests in said plurality as an individual I/O request; and dynamically adjusting said predetermined amount based on a plurality of measured system variables, via a feedback loop.

16. The method, as claimed in claim 15, further comprising the step of:

processing no more than a predetermined number of said block requests concurrently in a controller.

17. The method, as claimed in claim 15, wherein:

said computer data storage system includes a RAID data storage system.

18. The method, as claimed in claim 15, further including the step of:

adjusting said predetermined amount to increase data transfer bandwidth between said host computer and said array of disk drives.

19. The method, as claimed in claim 15, wherein:

said predetermined amount is adjusted once every I/O interval; and said method further includes the step of adjusting the length of said I/O interval based on said plurality of system variables.

20. The method, as claimed in claim 16, further including the step of:

adjusting said predetermined number to increase data transfer bandwidth between said host computer and said array of disk drives.

21. The method, as claimed in claim 16, further including the step of:

dynamically adjusting said predetermined number based on a plurality of measured system variables, via a feedback loop.

22. The method, as claimed in claim 21, wherein:

said predetermined number is adjusted once every I/O interval; and said method further includes the step of adjusting the length of said I/O interval based on said plurality of measured system variables.

* * * * *